Patented Dec. 21, 1937

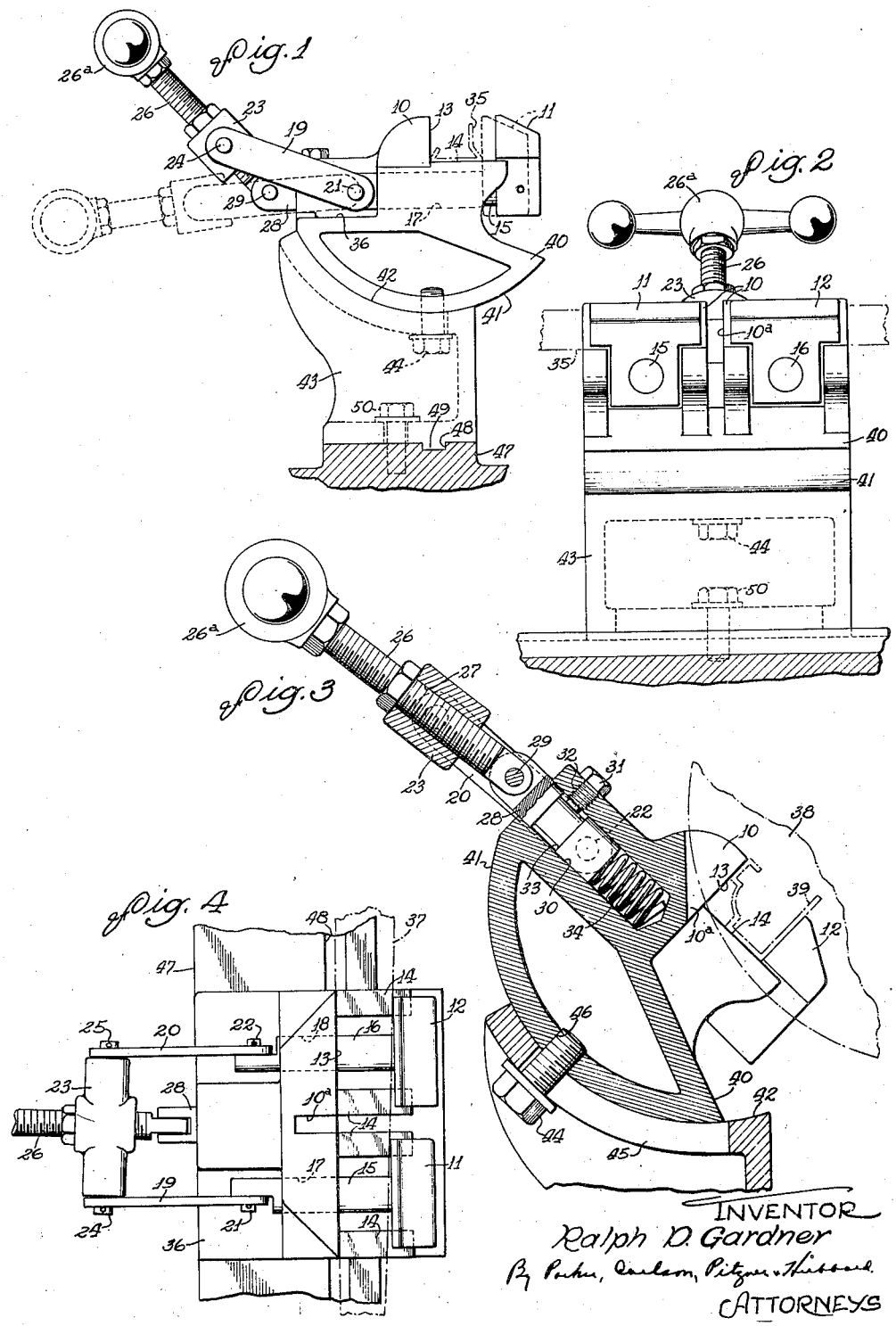

2,103,074

UNITED STATES PATENT OFFICE 2,103,074

CLAMPING DEVICE

Ralph D. Gardner, Rockford, Ill., assignor to Whitney Metal Tool Company, Rockford, Ill., a corporation of Illinois Application March 9, 1936, Serial No. 67,761

7 Claims. (Cl. 81—17)

My invention relates to clamping devices and more particularly to quick release type clamping devices.

It is an object of my invention to provide a quick release type clamping device in which an improved mechanism including a spring is utilized to adjust the pressure exerted on the work piece held in the clamping device.

Another object of my invention is to provide an improved quick release type clamping device provided with a toggle mechanism for actuating the clamping members of the device into and out of clamping position and a mechanism including a spring for adjusting the pressure exerted by the clamping members on the work piece.

Another object of my invention is to provide an improved quick release type clamping device provided with a toggle mechanism for actuating the clamping members of the device into and out of clamping position, a spring for adjustably limiting the pressure exerted by the clamping members on the work piece and an arrangement for utilizing the operating handle of the toggle mechanism to adjust the pressure exerted by the spring.

A further object of my invention is to provide an improved clamping device having relatively movable clamping members adapted to automatically adjust their relative positions in order to firmly grip a tapered or unsymmetrical work piece as well as a straight work piece.

Further objects and advantages of my invention will become apparent as the following description proceeds and the features of novelty which characterize my invention are pointed out with particularity in the claims annexed to and forming a part of this specification.

For a better understanding of my invention reference may be had to the accompanying drawing in which:

Figure 1 is a side elevation of a clamping device embodying my invention.

Fig. 2 is a front elevation of the clamping device shown in Fig. 1.

Fig. 3 is a side elevation, partly in section, in enlarged scale of the clamping device shown in Fig. 1 the clamping device being shown in its full clamping position.

Fig. 4 is a plan view of the clamping device shown in Fig. 1 illustrating the position of the parts thereof when an unsymmetrical or tapered work piece is gripped in the clamping device.

Referring to the drawing, I have shown in Fig. 1 a quick release type clamping device embodying my invention which is particularly adapted for clamping a work piece, which is to be cut by an abrasion disk or similar rotary disk type cutter, but it should be understood that clamping devices embodying my invention are susceptible of a wide variety of other uses.

My improved clamping device includes as its principal elements, relatively movable clamping members or jaws, a quick release type mechanism for moving the clamping jaws into and out of clamping position, and means including a spring for adjusting the pressure exerted on the work piece by the clamping jaws. It is particularly desirable to provide some such arrangement for limiting or adjusting the pressure exerted on the work piece by the clamping jaws when the work piece is made of comparatively light material and has an irregular cross section. For example, rolled sheet metal strips used as molding in various types of installations must be handled with particular care in cutting off portions thereof of a desired length in order to avoid distortion of the strips by the mechanism used to clamp the same during the cutting operation. My improved clamping device is particularly adapted to afford a firm support for such material while, at the same time, the clamping pressure exerted thereon is minimized.

In the particular construction illustrated the clamping device includes a fixed jaw 10 and a plurality of movable jaws 11 and 12 co-operating therewith. The fixed jaw 10 is provided with elongated transverse work supporting or bearing surfaces 13 and 14, which are arranged substantially at right angles with respect to each other. The movable jaws 11 and 12 are provided with laterally extending supporting pins 15 and 16 respectively which are slidably mounted in holes 17 and 18 extending through the fixed jaw 10 on opposite sides of a slot 10ª formed in the fixed jaw 10. The slot 10ª permits a cutting disk or the like to pass through a work piece gripped in the clamping device without contacting with the fixed jaw 10.

The movable jaws 11 and 12 are moved into and out of clamping relation with a work piece inserted between the movable jaws and fixed jaw by a quick release type operating mechanism. In the construction illustrated, this operating mechanism is a toggle linkage and includes links 19 and 20 which are pivotally connected at their inner ends to the adjacent ends of the supporting pins 15 and 16 by pivot pins 21 and 22. The outer ends of the links 19 and 20 are pivotally connected to the opposite ends of a cylindrical member 23 by pivot pins 24 and 25 respectively. A rod or screw 26 which is threaded in a tapped hole 27 extending through the member 23 forms the second link of the toggle mechanism, which is thus connected intermediate its ends to the first named links 19 and 20. The lower end of the rod 26 is pivotally connected to the U-shaped end of a plug 28 by a pivot pin 29.

The plug 28 is slidably mounted in a recess or bore 30 formed in the rear side of the fixed jaw 10 as shown in Fig. 3. A dog point screw 31 threaded in a tapped hole 32 is engageable with the shoulders forming the opposite walls of an annular groove 33 formed in the plug 28. The screw 31 thus prevents removal of the plug 28 from the bore 30 and limits the extent of axial movement of the plug therein.

A helical compression spring 34 is interposed between the bottom of the bore 30 and the inner end of the plug 28. This spring serves to limit the clamping pressure exerted by the jaws upon a work piece held between the same. Thus, when the rod 26 is moved upwardly to the position shown in Fig. 1, the movable jaws 11 and 12 are moved outwardly to the extreme right hand position thereof as viewed in Fig. 1. A work piece such as the work piece 35 indicated in dot-dash lines in Fig. 1 may then be placed between the fixed jaw 10 and the movable jaws 11 and 12. In order to clamp the work piece 35 in the clamping device, the rod 26 is then moved downwardly to the position shown in dotted lines in Fig. 1. Upon such movement, the links 19 and 20 move into alignment with the rod 26 and plug 28 so that the toggle mechanism is straightened out and the movable jaws 11 and 12 are consequently moved toward the fixed jaw 10 and into clamping relation with the work piece 35. The pivot pins 21, 22 and 29 are located a sufficient distance above the rear surface 36 of the fixed jaw 10 that the toggle mechanism may be moved a short distance beyond its dead center or straight position when the clamping device is fully closed on the work piece so that the toggle mechanism will be more stable in such closed position of the jaws. It will be seen that as the rod 26 is rotated in a counterclockwise direction as viewed in Fig. 1 the plug 28 is moved into the recess 30 compressing the spring 34 at the same time that the supporting pins 15 and 16 are pulled through the holes 17 and 18 by the links 19 and 20. The spring 34 is designed to have such a compressive strength or stiffness that it will be compressed after the movable jaws 11 and 12 have been moved into firm engagement with the work piece 35 and the pressure exerted on the latter is thus limited to a safe value. Consequently, distortion of the work piece is avoided.

The length of travel of the movable jaws 11 and 12 with respect to the fixed jaw 10 may be adjusted for different sizes of work pieces by screwing the rod 26 into or out of the member 23, that is rotating it about its longitudinal axis, and thus changing the effective length of the toggle link between the member 23 and pivot pin 29. This adjustment may conveniently be made by turning the T-shaped manual operating handle 26ª secured to the outer end of the rod 26. By so screwing the rod 26 into or out of the member 23, the pressure on the spring 34 is adjusted and consequently the pressure exerted by the clamping device on the work piece is similarly adjusted.

I prefer to use a T-shaped operating handle 26ª arranged in parallel relation with the pivot pin 29 since the rod 26 must be given at least a full half turn, or multiple thereof, in adjusting the same in order that the pivot pin 29 shall be in parallel relation with the other pivots 21, 22, 24, and 25 of the toggle mechanism after the adjustment is completed. If this parallel relation between the pivots is not had the toggle linkage cannot be operated. The T-shaped operating handle indicates by its horizontal position when this relation has been obtained. It will be seen that this adjustment operation may be effected by the handle 26ª without disconnecting any of the linkage parts or performing any other supplementary operations, thus greatly facilitating the ease of manipulation of the device.

I prefer to make the holes in the links 19 and 20 through which the pivot pins 24 and 25 pass, as well as the hole in the rod 26 through which the pivot pin 29 passes, sufficiently large in order that the pivotal connections shall be comparatively loose. This loose connection is especially advantageous when an unsymmetrical work piece, such as the tapered strip 37 indicated by dot-dash lines in Fig. 4, is to be held in the clamping device. From an inspection of Fig. 4 it will be seen that the loose pivotal connections between the elements of the toggle mechanism allow the movable jaw 11 to be moved out of alignment with the movable jaw 12 and into contact with the portion of the work piece 37 of reduced width. The tapered work piece 37 is thus firmly clamped between the fixed jaw 10 and movable jaws 11 and 12. I have found that various types of irregular or unsymmetrical work pieces may be effectively gripped in a clamping device of the type described since it readily adapts itself to such irregularities in shape without impairing the effectiveness of its clamping operations.

The clamping device described above is preferably mounted in such manner that it may be tilted about a horizontal axis in order to present different portions of the work piece to a cutting tool, or the like. Thus, in Fig. 3 I have diagrammatically illustrated a portion of an abrasive cutter disk 38 in dot-dash lines as engaging a work piece 39 also indicated in dot-dash lines. The fixed jaw 10 is provided with a supporting member 40 having an arcuate lower surface 41 which rests on a complementary arcuate upper surface 42 of a supporting bracket 43. The clamping device may thus be tilted about a horizontal axis by moving the supporting member 40 with respect to the bracket 43. Relative movement between the supporting member 40 and bracket 43 may then be prevented after the desired angular adjustment has been obtained by tightening a clamping bolt 44 which passes through a slot 45 formed in the upper surface 42 of the supporting bracket 43. The inner end of the clamping bolt 44 is threaded in a tapped hole 46 formed in the lower wall of the supporting member 40.

In order to facilitate transverse movement of the clamping device I preferably mount the same on a guideway 47 which is provided with a groove 48 therein. The bottom wall of the supporting bracket 43 is provided with a depending key or tongue 49 which slides in the groove 48. The bracket 43 may be firmly clamped in any desired position on the guideway 47 by a clamping screw 50 which extends through a slot formed in the base of the bracket 43.

Although I have shown a particular embodiment of my invention especially adapted for use in a cut-off machine, I do not desire my invention to be limited to the particular construction shown and described and I intend in the appended claims to cover all modifications within the spirit and scope of my invention.

I claim as my invention:

1. A quick release type clamping device comprising, in combination, a fixed clamping jaw having an aperture extending therethrough, a co-operating movable jaw provided with a supporting pin slidably mounted in said aperture, said fixed jaw having a recess formed in the side thereof opposite said movable jaw, a plug slidably mounted in said recess, a threaded rod, means for pivotally connecting said threaded rod to the outer end of said plug, a member threaded on said rod, a link, means for pivotally connecting the opposite ends of said link to said member and to said supporting pin, and means including a compression spring interposed between said plug and the bottom of said recess for limiting the movement of said movable jaw toward said fixed jaw upon relative movement of said rod and said link.

2. A quick release type clamping device comprising, in combination, a fixed clamping jaw and a movable clamping jaw co-operating therewith, a link pivotally connected adjacent one end thereof to said movable jaw, a member having a threaded aperture extending therethrough, means for pivotally connecting said member to said link adjacent the opposite end thereof, a rod threaded in said aperture, and means including a compression spring interposed between one end of said rod and said fixed jaw for limiting the pressure applied to said movable jaw upon relative movement of said link and said rod.

3. A quick release type clamping device comprising, in combination, a pair of relatively movable clamping jaws, means including a toggle mechanism for moving said clamping jaws into and out of clamping position, means including a spring associated with said toggle mechanism for limiting to a predetermined amount the clamping pressure exerted by said jaws, said toggle mechanism including an operating handle, means operatively connecting said handle to the remainder of said toggle mechanism and supporting said handle for rotation independently of the remainder of said toggle mechanism and without change in said operative connection, and means movable by rotation of said operating handle for adjusting the pressure exerted by said spring on said relatively movable clamping jaws.

4. A quick release type clamping device comprising, in combination, a fixed clamping jaw having a plurality of apertures extending therethrough and presenting an elongated transverse clamping surface, a plurality of oppositely positioned clamping jaws arranged in alignment along said transverse clamping surface and provided with supporting pins slidably mounted in said apertures, said fixed jaw having a recess formed in the side thereof opposite said movable jaws, a plug slidably mounted in said recess, a threaded rod, means including a loose pivotal connection for connecting said threaded rod to the outer end of said plug, a member threaded on said rod, a plurality of operating links, and means including loose pivotal connections for connecting the opposite ends of said links to said member and to said supporting pins for moving said movable jaws into clamping relation with an unsymmetrical work piece and with said movable jaws out of alignment with each other.

5. A quick release type clamping device comprising, in combination, a fixed clamping jaw having a plurality of apertures extending therethrough and presenting an elongated transverse clamping surface, a plurality of oppositely positioned clamping jaws arranged in alignment along said transverse clamping surface and provided with supporting pins slidably mounted in said apertures, said fixed jaw having a recess formed in the side thereof opposite said movable jaws, a plug slidably mounted in said recess, a threaded rod, means including a loose pivotal connection for connecting said threaded rod to the outer end of said plug, a member threaded on said rod, a plurality of operating links, means including loose pivotal connections for connecting the opposite ends of said links to said member and to said supporting pins for moving said movable jaws into clamping relation with an unsymmetrcal work piece and with said movable jaws out of alignment with each other, and means including a compression spring interposed between said plug and the bottom of said recess for limiting the movement of said movable jaws toward said fixed jaw upon relative movement of said rod and said operating links.

6. A clamping device comprising, in combination, a pair of relatively movable clamping jaws, an operating handle, means supporting said handle for swinging movement and alternatively for rotational movement about its longitudinal axis, means operatively connected to said handle irrespective of said rotational movement thereof and operative in response to swinging movement of said handle for moving said jaws into and out of clamping relation, and means operative in response to rotational movement of said handle about its longitudinal axis for varying the clamping pressure exerted by said jaws.

7. A quick release type clamping device comprising, in combination, a fixed clamping jaw, a cooperating movable clamping jaw, said fixed jaw having a recess formed in the side thereof opposite said movable jaw, a plug slidably mounted in said recess, a threaded rod, a pivot pin connecting said threaded rod at the outer end of said plug, a member threaded on said rod, a link, means for pivotally connecting the opposite ends of said link to said member and to said movable jaw, means including a compression spring interposed between said plug and bottom of said recess for limiting the movement of said movable jaw toward said fixed jaw upon relative swinging movement of said rod and said link, and means including a T-shaped operating handle secured to the outer end of said rod with the cross portion thereof disposed substantially in parallel relation with said pivot pin for rotating said handle to vary the pressure exerted on said spring.

RALPH D. GARDNER.